United States Patent [19]

Suganuma

[11] Patent Number: 4,672,274
[45] Date of Patent: Jun. 9, 1987

[54] MOTOR CONTROL CIRCUIT FOR VIDEO TAPE RECORDERS

[75] Inventor: Atsushi Suganuma, Yokohama, Japan
[73] Assignee: Victor Company of Japan, Ltd., Japan
[21] Appl. No.: 842,361
[22] Filed: Mar. 19, 1986
[30] Foreign Application Priority Data Mar. 20, 1985 [JP] Japan .................................. 60-56955
Mar. 20, 1985 [JP] Japan .................................. 60-56956

[51] Int. Cl.$^4$ ............................................. H02P 6/02
[52] U.S. Cl. .................................... 318/254; 318/138;
318/439
[58] Field of Search ....................... 318/138, 254, 439;
310/68 R

[56] References Cited

U.S. PATENT DOCUMENTS 4,430,603 2/1984 Muller ................................ 318/254
4,501,997 2/1985 Muller ................................ 318/254
4,531,079 7/1985 Muller ................................ 318/254

FOREIGN PATENT DOCUMENTS

57-40390 3/1982 Japan ................................. 318/254

Primary Examiner—William M. Shoop, Jr.
Assistant Examiner—Bentsu Ro
Attorney, Agent, or Firm—Lowe, Price, LeBlanc, Becker & Shur

[57] ABSTRACT

A cylinder drive motor includes a magnetized annular member having a series of equally spaced apart alternating pole elements and an additional pole element located within an interval between successive ones of the pole elements of the series. The pole elements are detected by a single sensor and a sinusoidal signal is generated having a series of higher-amplitude peaks successively occurring in correspondence with the pole elements of the series and a lower-amplitude peak occurring within an interval between successive ones the higher-amplitude peaks in correspondence with the additional pole element. The sinusoidal signal is compared with first and second reference levels to generate a speed-related pulse signal representative of the frequency at which the higher-amplitude peaks cross the first reference level and a phase-related pulse signal representative of the timing at which said lower-amplitude peak crosses the second reference level. The speed-related pulse signal is converted to a voltage signal and combined with a phase error signal derived from the phase-related pulse signal. A current proportional to the combined signals is generated and sequentially supplied to the coils in response to the speed-related pulse signal.

4 Claims, 9 Drawing Figures

MOTOR CONTROL CIRCUIT FOR VIDEO TAPE RECORDERS

BACKGROUND OF THE INVENTION

The present invention relates to a motor control circuit, and specifically to a control circuit for controlling a DC brushless motor which drives the cylinder of a helical scan video tape recorder.

In conventional video tape recorders of the helical scan type, magnetic tape is wound on a rotary cylinder having a pair of video heads so that the tape is obliquely scanned by the heads. The cylinder is driven by a multiphase DC brushless Ws motor having Hall generators which detect the relative position of the rotor for switching the current supplied to stator coils. The Hall generators are associated respectively with the stator coils. To permit the video heads to precisely trace the intended tracks it is necessary that the rotational speed and angle of the cylinder be controlled to within the specified range of close tolerances. Currently, a tachogenerator is employed to detect the speed of the cylinder and the rotational angle of the cylinder is derived by a proximity sensor which detects the proximity to rotating magnets mounted in diamterically opposite positions of the cylinder. It has therefrom been desired to reduce the components and simplify the motor control circuitry.

SUMMARY OF THE INVENTION

It is therefore an object of the present invention to provide a simplified motor control circuit for helical-scan video tape recorders.

According to the present invention, detectable means, such as magnetized annular member, is mounted on the rotor of the motor and includes a series of first detectable elements located at equal intervals and a second detectable element located within an interval between successive ones of the first detectable elements. A speed and phase sensing means detects the detectable elements and generates a sinusoidal signal having a series of higher-amplitude peaks successively occurring in correspondence with the first detectable elements and a lower-amplitude peak occurring within an interval between successive ones of the higher-amplitude peaks in correspondence with the second detectable element. The sinusoidal signal is compared with first and second reference levels to generate a speed-related pulse signal representative of the frequency at which the higher-amplitude peaks cross the first reference level and a phase-related pulse signal representative of the timing at which said lower-amplitude peak crosses the second reference level. The speed-related pulse signal is converted to a voltage signal so that it represents the speed of rotation of the rotor. An error detecting circuit detctes a phase difference between the phase-related pulse signal and a phase reference and generates a phase error signal, which is combined with the voltage signal. A switching circuit generates a current proportional to the combined signals and sequentially supplies the current to the coils in response to the speed-related pulse signal.

BRIEF DESCRIPTION OF THE DRAWINGS

The present invention will be described in further detail with reference to the accompanying drawings, in which.

Figure 1:
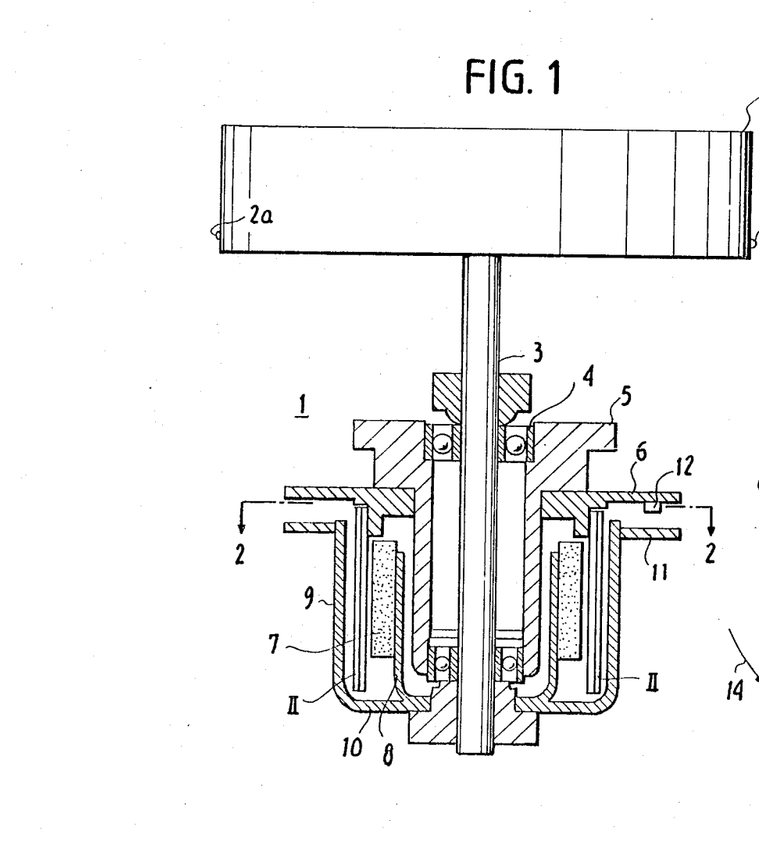
FIG. 1 is a cross-sectional view in elevation of a cylinder drive motor of a video tape recorder embodying the invention.

In FIG. 1, a DC brushless motor 1 of the invention drives a cylinder 2 having a pair of video heads 2a, 2b. Cylinder 2 is fixedly supported on a rotary shaft 3 of the motor which is rotatably coupled by a bearing 4 to a stationary sleeve 5 mounted on a stator core plate 6. Three stator coils I, II and III are secured to the underside of stator core plate 6. A cylindrical permanent magnet 7 is mounted on an inner support 8 of a rotor 10. Rotor 10 has an outer support 9 which carries a magnetized annular member 11.

Permanent magnet 7 is equally divided into eight segments of part-cylindrical shape presenting outwardly facing alternating pole pieces to the stator coils I, II and III. Each of the stator coils has four vertically extending coil segments which are connected in series and divided into two pairs located diametrically opposite to each other with respect to the axis of rotation of rotor 10. As illustrated in developed form in FIG. 3, coil segments $I_1$ and $I_3$ allow current to flow in a downward direction and coil segments $I_2$ and $I_4$ in the opposite direction, and at a given instant of time coil segments $I_1$ and $I_2$ face North poles of the permanent magnet 7 and coil segments $I_3$ and $I_4$ face South poles of that magnet as indicated at A in FIG. 3. As a result, the cylindrical magnet 7 is given a thrust in a counterclockwise direction. If the current is continuously applied to the coil I, all of its coil segments would face South poles and the rotor would lose the thrust. To prevent this, it is necessary to switch the current to coil II at proper timing before all the segments of coil I face South poles. The switching of current to coil II occurs when magnet 7 rotates to a position indicated at B, FIG. 3, since in this condition coil segments $II_1$ and $II_3$ are facing North poles and coil segments $II_2$ and $II_4$ are facing South poles. Likewise, the current is switched to coil III when the magnet 7 has rotated to a position indicated at C, and subsequently to coil I when it has rotated to a position D. The process is repeated to turn the rotor continuously.

Figure 2:
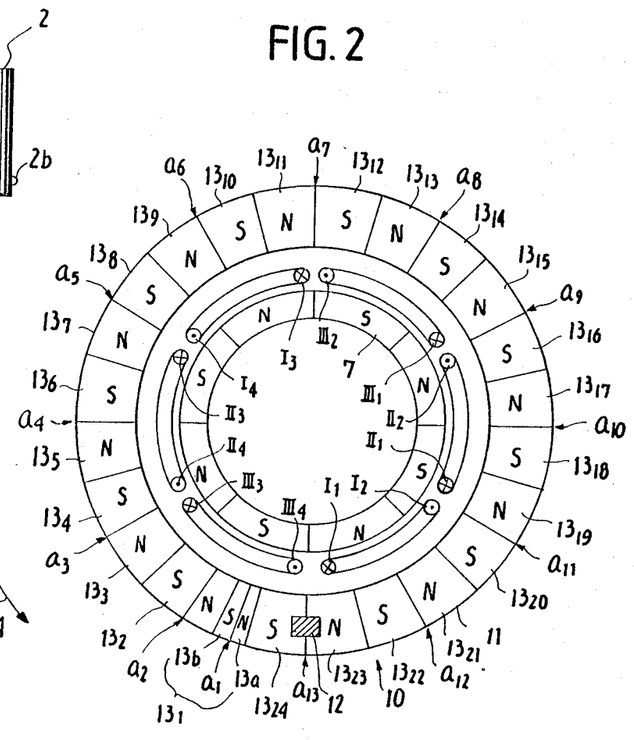
FIG. 2 is a cross-sectional view taken along the lines 2—2 of FIG. 1.

To achieve the switching operation properly, a Hall generator 12 is secured to the underside of stator core plate 6 immediately above the surface of magnet plate 11. Magnet plate 11 is equally divided into twenty-four sectors 13. Except for a sector $13_1$, sectors $13_2$ through $13_{24}$ are magnetized with alternating poles. Sector $13_1$ is subdivided into two North pole regions and a South pole region therebetween. Transitions from North poles to the next adjacent South poles in a direction opposite the direction of rotation of rotor 10 (as indicated by the arrow 14) are designated a₁ through a₁₃, with the transition a₁ being defined between North-pole region 13a and South-pole region 13b.

Hall generator 12 detects magnetic field variations when the magnet plate 11 rotates with the cylinder 7 and impresses a voltage generated as a result of the field variations to a differential amplifier.

Figure 5:
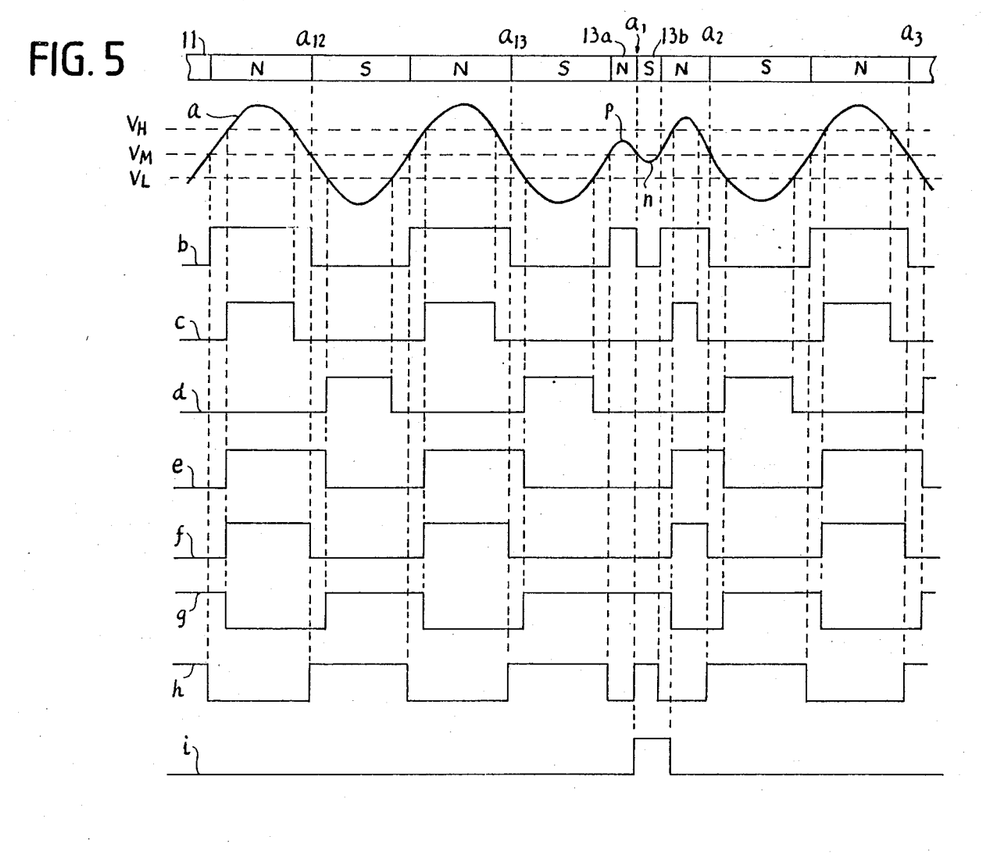
FIG. 5 is a waveform diagram associated with FIG. 4.

As shown in FIG. 5, the differential amplifier supplies a sinusoidal voltage a having a positive peak with respect to a reference voltage as the flux of each North pole of magnet plate 11 crosses the Hall generator 12 and a negative peak with respect to the reference voltage as the flux of each South pole crosses the Hall generator. The reference voltage is generated when the Hall generator is crossed by each of the boundaries between successive poles. The amplitude of the peaks is proportional to the field strength of the poles. As best seen in FIG. 5, the positive peak that is generated in response to the flux of North-pole region 13a crossing the Hall generator 12 has a potential lower than the potential of any other positive peaks and the negative peak that is generated in response to the flux of South-pole region 13b crossing Hall generator 12 has a potential higher than the potential of any other negative peaks.

Figure 3:
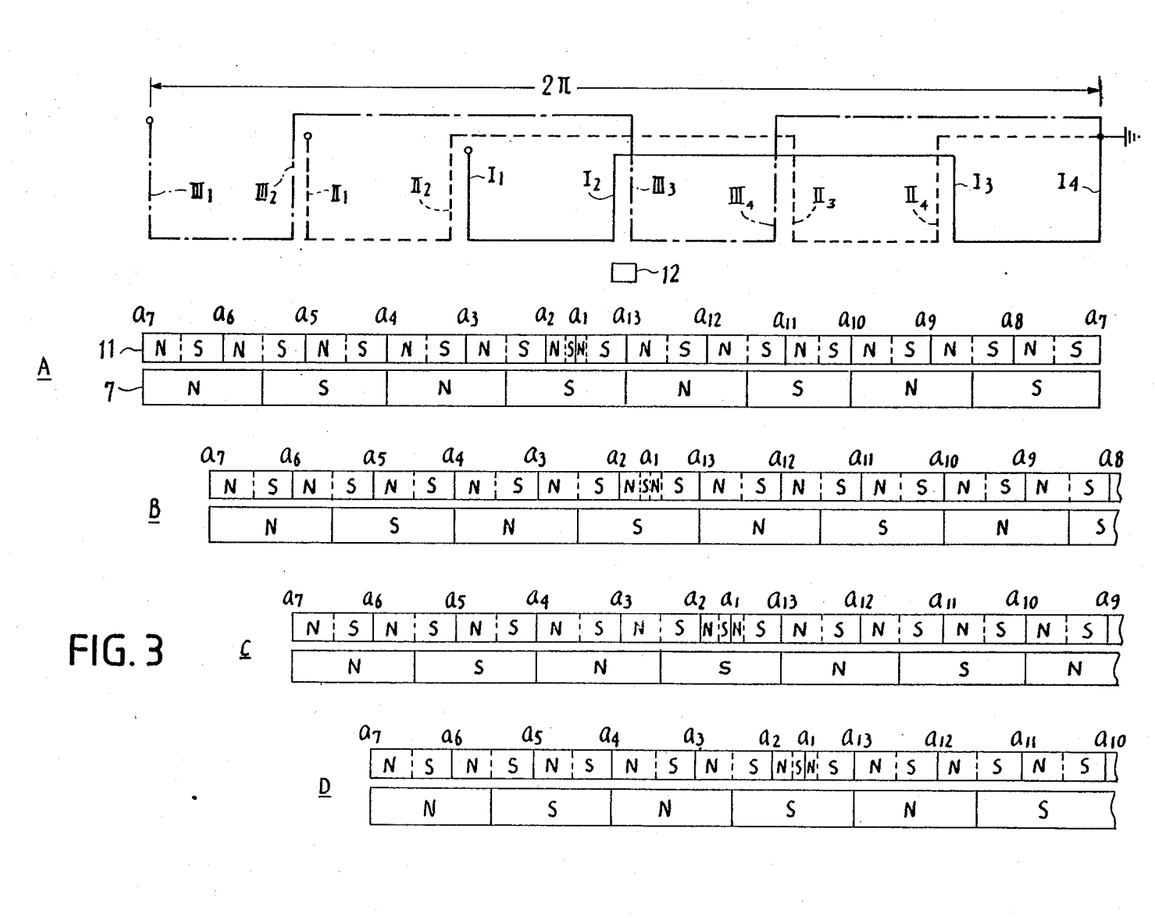
FIG. 3 is an illustration of stator coils in developed form in relation with rotor magnetic poles.

It is thus seen that in FIG. 3 the current is applied to coil I at the instant the Hall generator 12 detects transition a13 and then switched to coil II at the instant the Hall generator detects transition a2. Likewise, the current is subsequently switched from coil II to coil III when the Hall generator detects transition a3 and the current is then switched to coil I when transition a4 is detected.

Since the field transition points a2 through a13 are recyclically equally spaced apart from each other, a motor speed control signal can be derived from these transition points. On the other hand, a phase control signal is derived from transition point a1 between poles 13a and 13b.

Figure 4:
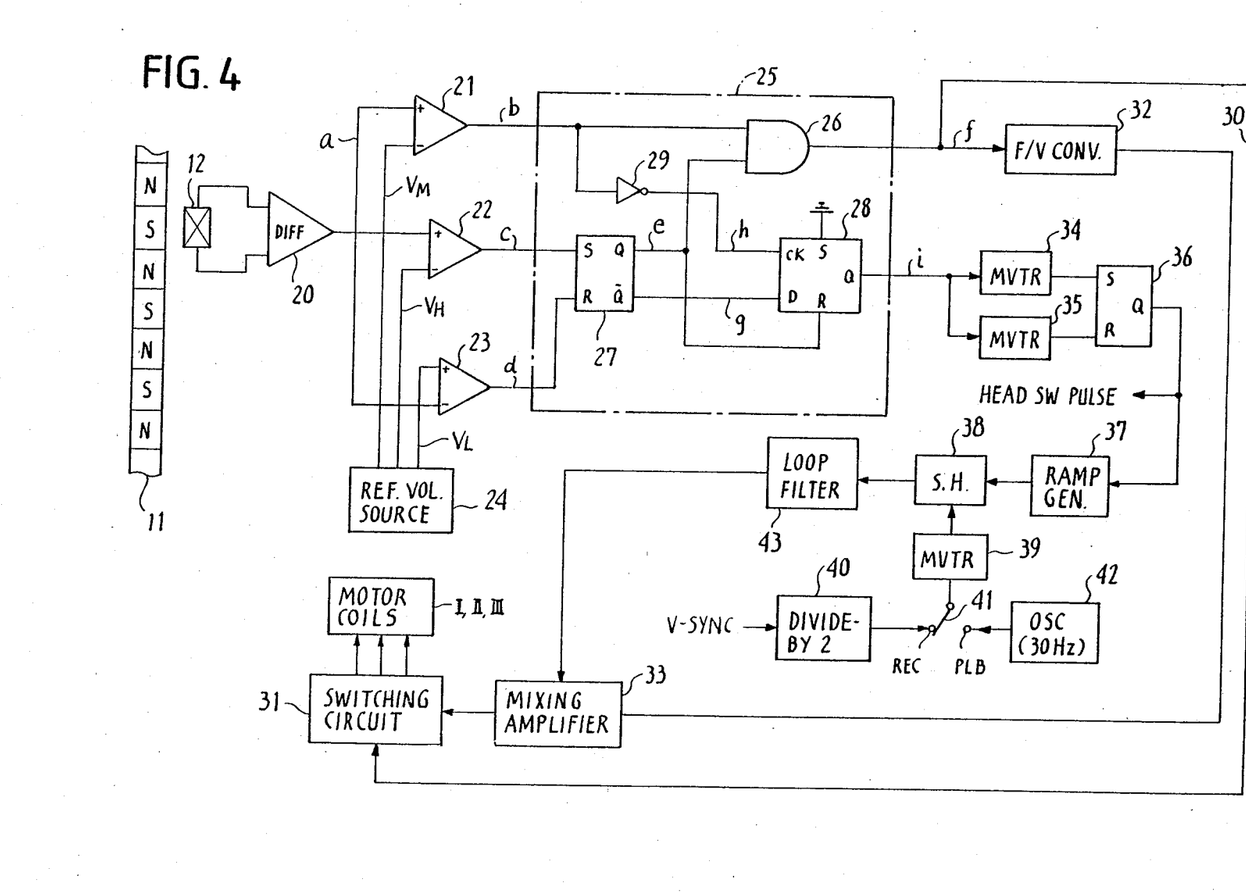
FIG. 4 is a block diagram of a motor control circuit of the invention.

Referring to FIG. 4, a motor control circuit of the invention is illustrated. the output of the Hall generator 12 is applied to the differential amplifier 20 which applies a sinusoidal output to the noninverting inputs of comparators 21, 22 and 23. A reference voltage source 24 supplies medium, high and low threshold voltages $V_M$, $V_H$ and $V_L$ to the inverting inputs of comparators 21, 22 and 23, respectively.

As seen in FIG. 5, when the output of differential amplifier 20 exceeds threshold $V_H$, the output of comparator 22 goes high, producing a series of pulses as shown at c. Threshold $V_H$ lies between the maximum voltage at a positive peak p derived from North-pole region 13a and the minimum voltage at any other positive peaks. Therefore, pulses c are generated in response to every positive peak except for the minimum positive peak p. When the sinusoid a drops below the threshold $V_L$, the output of comparator 23 goes high, producing a series of pulses d. Threshold $V_L$ lies between the minimum voltage at a negative peak n derived from South-pole region 13b and the maximum voltage of any other negative peaks. Therefore, pulses d are generated in response to every negative peak except for the negative peak n. When the sinusoid a exceeds the medium threshold $V_M$, comparator 21 produces a pulse b. Threshold VM corresponds to the reference voltage mentioned previously and lies between the positive peak p and the negative peak n so that pulses b occur for every positive peak.

The outputs of comparators 21, 22 and 23 are applied to a logic circuit 25 which comprises an AND gate 26, an R-S flip-flop 27 and a D flip-flop 28. Pulse b is applied to a first input of AND gate 26 and to the clock input of D flip-flop 28 via an inverter 29 and pulses c and d are coupled to the set and reset inputs of flip-flop 27, the true output of flip-flop 27 being applied to the second input of AND gate 26 and to the reset input of flip-flop 28. The complementary output of flip-flop 27 is applied to the D input of flip-flop 28.

The operation of the logic circuit 25 is understood with reference to FIG. 5. Flip-flop 27 is set in response to the leading edge of pulse and reset immediately following the leading edge of pulse d, producing a pulse e at the true output. AND gate 26 is activated for a period from the leading edge of pulse e to the trailing edge of pulse b, thus producing a pulse f which is applied on line 30 to a switching circuit 31 and to a frequency-to-voltage converter 32 whose output is coupled to one input mixing amplifier 33. Flip-flop 28 is clocked in response to the leading edge of pulse h from inverter 29. If pulse signal g from the complementary output of flip-flop 27 is low, the output i of flip-flop 28 is low. The output of flip-flop 28 goes high when it is clocked during the period the pulse signal g is high. The leading edge of pulse i occurs precisely in response to transition a1.

The output of flip-flop 28 is used as a phase control signal and applied to monostable multivibrators 34 and 35. In response to the leading edge of pulse i, multivibrator 34 produces a short-duration pulse having a pulse duration shorter than the pulse duration of pulse i and in response to the trailing edge of pulse i, multivibrator 35 produces a long-duration pulse having a pulse duration longer than the pulse duration of pulse i. The outputs of multivibrators 34 and 35 are applied to the set and reset inputs of a flip-flop 36, respectively, so that it sets in response to the trailing edge of the short-duration pulse and resets in response to the trailing edge of the long-duration pulse. By appropriately dimensioning the period of multivibrator 34, flip-flop 36 produces a pulse with a 50% duty ratio and a frequency of 30 Hz. This pulse is applied as a head switching pulse to a circuit, not shown, that alternately switches between video heads 2a, 2b. The output of flip-flop 36 is also coupled to a ramp generator 37 to cause it to apply a ramp voltage to a sample-and-hold circuit 38.

Sample-and-hold circuit 38 is sampled at proper timing determined by a monostable multivibrator 39 which derives a sampling pulse from a divide-by-2 frequency divider 40 in a reording mode through a mode selecting switch 41 and derives the sampling pulse from a 30-Hz oscillator 42 in playback. Frequency divider 40 receives 60-Hz vertical sync pulses separated from a video signal to synchronize the sampling pulse with the frames of the video signal.

The voltage sampled and stored in sample-and-hold circuit 38 represents the instantaneous value of a ramp voltage and hence the time deviation of the phase control signal from flip-flop 36 with respect to the time reference represented by the sampling pulse from multivibrator 39.

The output of sample-and-hold circuit 38 is applied through a loop filter 43 to the second input of mixing amplifier 33 where the phase error signal is summed with the speed control signal from frequency-to-voltage converter 32 and fed to the switching circuit 31 which sequentially supplies motor coils I, II and III with a current proportional to the output of mixing amplifier 33 at proper timing in response to pulse f.

Figure 6:
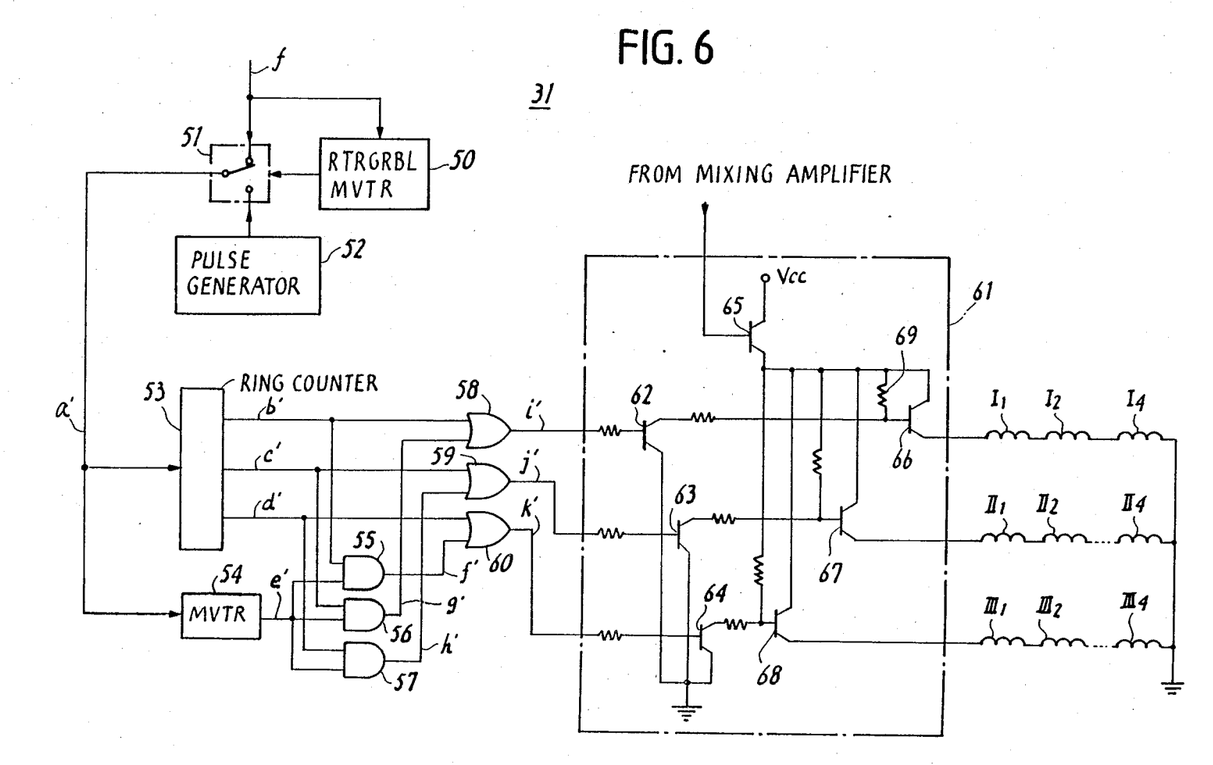
FIG. 6 is an illustration of details of the switching circuit of FIG. 5.

Details of the switching circuit 31 are shown in FIG. 6. The function of this switching circuit is to produce a series of switching pulses for coils I, II and III respectively such that each switching pulse slightly overlaps with the subsequent switching pulse. Switching circuit 31 includes a retriggerable monostable multivibrator 50 which is responsive to pulse f to produce an output pulse if pulse f has a pulse spacing smaller than a predetermined value which corresponds to a prescribed motor speed. Thus, when the motor speed is smaller than the prescribed speed, the output of retriggerable multivibrator 50 is low. An elecronic switch 51 responds to the output of retriggerable multivibrator 50 by supplying the pulse f to a ring counter 53 when the motor speed is lower than the prescribed value or supplying the output of a pulse generator 52 thereto instead when the motor speed exceeds the prescribed value.

Figure 7:
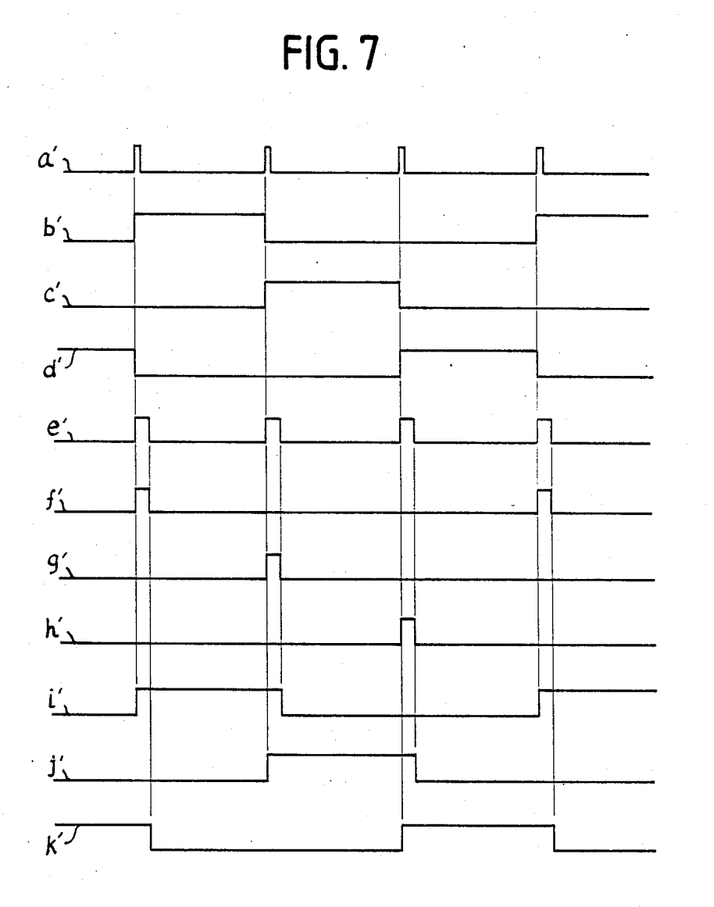
FIG. 7 is a waveform diagram associated with FIG. 6.

Ring counter 53 sequentially generates pulses b', c' and d' of equal pulse duration as illustrated in FIG. 7 in response to pulses a' from the switch 51. Pulse a' is also applied to a monostable multivibrator 54 to cause it to generate a pulse e' with a fixed duration greater than the duration of pulses a' and supplies its output to AND gates 55, 56 and 57 to which the outputs of ring counter 53 are also applied. Thus, pulses f', g' and h' are sequentially generated from AND gates 55, 56 and 57. Pulse g' is combined with pulse b' in an OR gate 58 to produce a pulse i' with a duration which is a sum of the durations of pulses b' and g'. Likewise, pulses c' and h' are combined in an OR gate 59 and pulses d' and f' are combined in an OR gate 60 to produce pulses j' and k', respectively. Each of the pulses i', j' and k' coexists with a subsequent pulse for a duration corresponding to the duration of pulse e'.

Pulses i', j' and k' are applied to switching transistors 62, 63 and 64 of a switching amplifier circuit 61. The output of mixing amplifier 33 is applied to the base of a current-supply transistor 65. Transistor 65 supplies a current proportional to the output of mixing amplifier 33 to the emitters of output transistors 66, 67 and 68 whose bases are connected respectively to the collectors of switching transistors 62, 63 and 64. The collectors of output transistors 66, 67 and 68 are respectively connected to the coils I, II and III. Thus, the application of pulse i' to the base of transistor 62 causes a current to be supplied from a voltage supply Vcc through transistor 65 and through a bias resistor 69, developing a base potential that biases transistor 66 in proportion to the voltage output of mixing amplifier 33 and coil I is energized accordingly. Similarly, the application of pulses j' and k' to the bases of transistors 63 and 64 causes the current to be switched to coil II and thence to coil III in succession with an overlapping period therebetween to prevent the otherwise loss of rotary thrust.

If phase control pulse i deviates from the time reference, the output of mixing amplifier 33 rises correspondingly and the current applied to the motor coils increases until the phase difference reduces to zero, so that the motor 1 rotates in precision timing. Retriggerable multivibrator 50 permits the feedback speed control operation to respond to the speed control pulse f when the motor speed is below a prescribed level and permits it to switch to the constant-interval pulses from pulse generator 52 when the motor has attained a steady speed.

Figure 8:
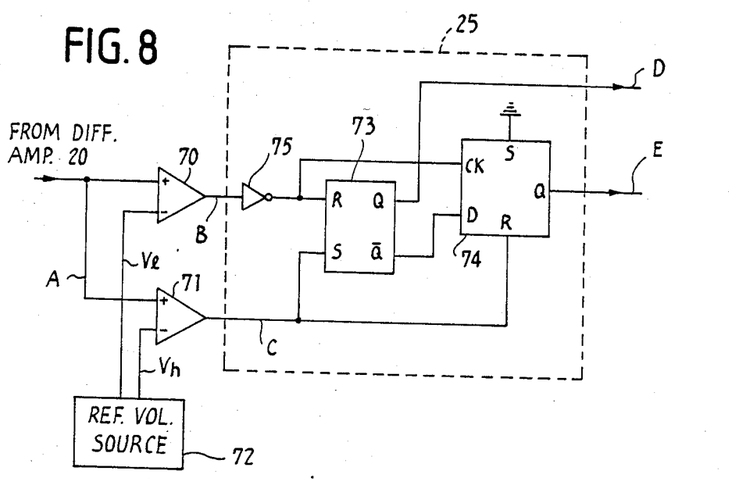
FIG. 8 is an illustration of a modified form of the invention.
Figure 9:
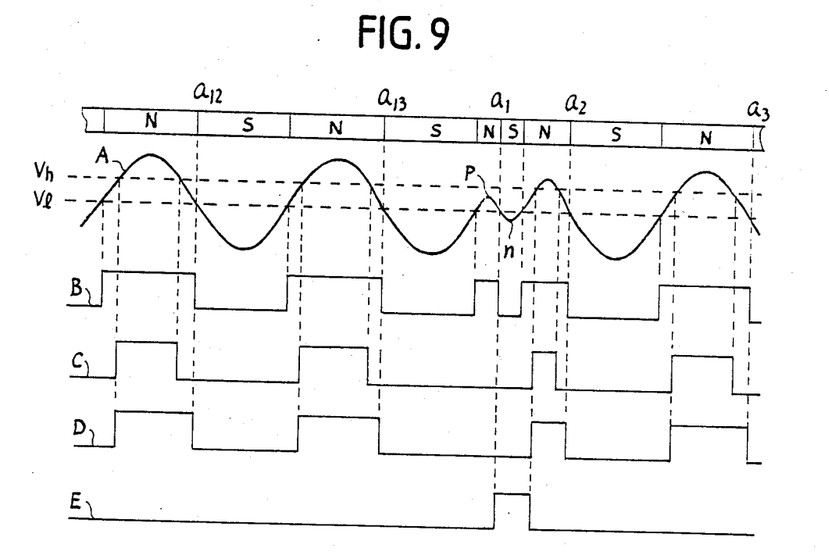
FIG. 9 is a waveform diagram associated with FIG. 8. cl DETAILED DESCRIPTION

The motor control circuit is simplified as shown in FIG. 8. In this modification, two comparators 70 and 71 are employed instead of the three comparators of the previous embodiment. Sinusoidal output A from differential amplifier 20 is applied to the noninverting inputs of comparators 70 and 71. A reference voltage source 72 supplies a high threshold reference Vh to the inverting input of comparator 71 and a lower threshold reference Vl to the invertinginput of comparator 70. Higher threshold Vh lies between the maximum value of positive peak p and the minimum value of any other positive peaks and lower threshold Vl lies between positive peak p and negative peak n. Comparator 70 produces a pulse B (FIG. 9) when sinusoid A exceeds the lower threshold Vl and comparator 71 produces a pulse C when the sinusoid exceeds the higher threshold Vh. Pulse B is inverted by an inverter 75 and applied to the reset input of a flip-flop 73 and pulse C is applied to the set input of the flip-flop 73. Thus, flip-flop 73 is set in response to the leading edge of a pulse C and reset in response to the trailing edge of a pulse B, producing a series of pulses D from the Q output to be applied to frequency-to-voltage converter 32 and to the switching circuit 31. The complementary output of flip-flop 73 is applied to the D input of a flip-flop 74 which is clocked by the output of inverter 75 and reset by pulse C. The Q output of flip-flop 74 goes high in response to the clock input that occurs at transition a1 during the low-level period of the D input, producing a pulse E to be supplied to multivibrators 34 and 35.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A control circuit for a brushless DC motor having a stator including a plurality of coils and a rotor including a series of alternating magnetic poles facing said coils, comprising:

detectable means mounted on said rotor and having a series of first detectable elements located at equal intervals and a second detectable element located within an interval between successive ones of said first detectable elments;

speed and phase sensing means in coating relationship with said detectable means for detecting said detectable elements and generating a sinusoidal signal having a series of higher-amplitude peaks successively occurring in correspondence with said first detectable elements and a lower-amplitude peak occurring within an interval between successive ones of said higher-amplitude peaks in correspondence with said second detectable element;

signal generating means for comparing said sinusoidal signal with first and second reference levels and generating a speed-related pulse signal representative of frequency at which said higher-amplitude peaks cross said first reference level and a phase-related pulse signal representative of timing at which said lower-amplitude peak crosses said second reference level;

converting means for converting said speed-related pulse signal to a voltage signal representative of speed of rotation of said rotor;

error detecting means for detecting a phase difference between said phase-related pulse signal and a phase reference and generating a phase error signal;

mixing means for combining said phase error signal with said voltage signal and forming a combined signal; and switching means for generating a current proportional to said combined signal and sequentially supplying said current to said coils in response to said speed-related pulse signal.

2. A control circuit as claimed in claim 1, wherein said detectable means comprises:

an annular member of magnetic material having a series of equally spaced apart alternating magnetic poles and an aditional magnetic pole located within an interval between successive ones of the magnetic poles of said series, said additional magnetic pole having a field strength smaller than the field strength of the magnetic poles of said series, wherein said speed and phase sensing means comprises a Hall generator located on said stator in a coacting relationship with said annular member and a differential amplifier means coupled to said Hall generator for generating said sinusoidal signal.

3. A control circuit as claimed in claim 1, wherein said error detecting means comprises:

a ramp generator responsive to said phase-related pulse signal for generating a ramp voltage; and sample-and-hold means for sampling said ramp voltage in response to a reference timing signal and storing the sampled ramp voltage and applying the output of the sample-and-hold hold means to said mixing means as said phase error signal.

4. A control circuit as claimed in claim 1, further comprising a pulse generator for generating constant-frequency pulses and means for applying said speed-related pulse signal to said switching means when said speed-related pulse signal has a frequency lower than a predetermined value and applying said constant-frequency pulses to said switching means when the frequency of said speed-related pulse signal exceeds said predetermined value.

* * * * *